July 11, 1939.  A. CHILTON ET AL  2,165,453

MULTIPLE ENGINE POWER PLANT

Filed Oct. 27, 1936  2 Sheets-Sheet 1

Patented July 11, 1939

2,165,453

UNITED STATES PATENT OFFICE 2,165,453

MULTIPLE ENGINE POWER PLANT

Allan Chilton, Glen Rock, Chester C. De Pew, Bloomfield, and Roland Chilton, Ridgewood, N. J., assignors, by mesne assignments, to Wright Aeronautical Corporation, Paterson, N. J., a corporation of New York Application October 27, 1936, Serial No. 107,892

10 Claims. (Cl. 60—97)

This invention relates to power plants in general, and particularly to aeronautical power plants, and it discloses novel and useful means whereby two or more conventional engines may be assembled to independently drive concentric propeller shafts.

The demand for increased horsepower in airplane power plants has outrun the development of large engines because of the high cost in time and money involved in such development. For racing purposes, two water-cooled engines have been assembled in tandem to drive reverse rotating propellers, but this arrangement is not applicable to radial engines, and a prime object of the present invention is to provide means whereby the advantages of the duplex power plant may be realized with the more popular radial air-cooled engines.

An associated object is to develop a compact and robust gear unit whereby the propellers are independently driven by respective engines so that the unit may be operated with one or more engines and propellers in use, thereby giving equal reliability equal to an ordinary multi-engine installation in an aircraft even though only a single duplex unit be used. In general, an increased factor of safety will be afforded because these large power units are desired for very large airplanes which will require a plurality of the duplex power plants.

A further object is to provide a disposition favorable for good cooling and minimum head resistance of radial air-cooled engines, with simple cowling means.

Other objects of the invention will be obvious from or will be pointed out in the following description with reference to the drawings, in which:

Fig. 3 is a fragmentary segmental view of the cylinders and associated cowling of one of the engines.

Figure 1:
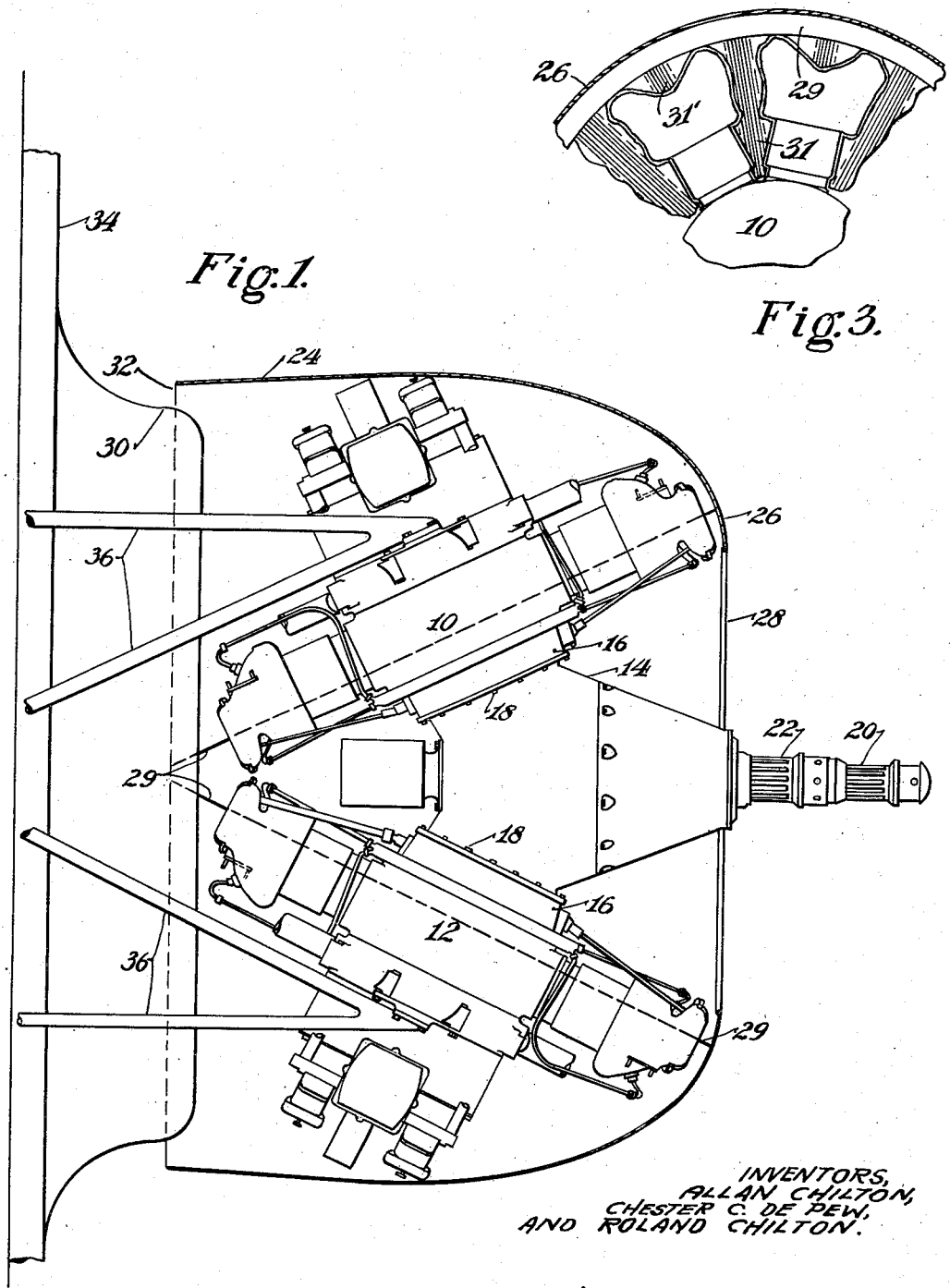
Fig. 1 is a plan view showing the installation of a duplex unit, with the cowl in section.

Referring first to Fig. 1, 10 and 12 designate conventional radial air-cooled engines disposed respectively on the left and right hand side of the unit with the driving ends of the crankshaft axes intersecting within a gear housing 14, to which nose pieces 16 of the engines are secured as by suitable bolts 18. Protruding from the nose of the gear housing 14 is an inner shaft 20 for a front propeller (not shown) and an outer concentric shaft 22 for a rear propeller (not shown).

A cowling 24 envelops the power plant and has an inturned nose section 26 defining an air entrance opening 28 while a rear cowl 30 defines a cooling air exit slot 32. In the case of a wing installation, the leading edge of the wing would be located as indicated by the line 34, and the engines are supported from the wing by a suitable engine mount such as indicated by 36.

Figure 2:
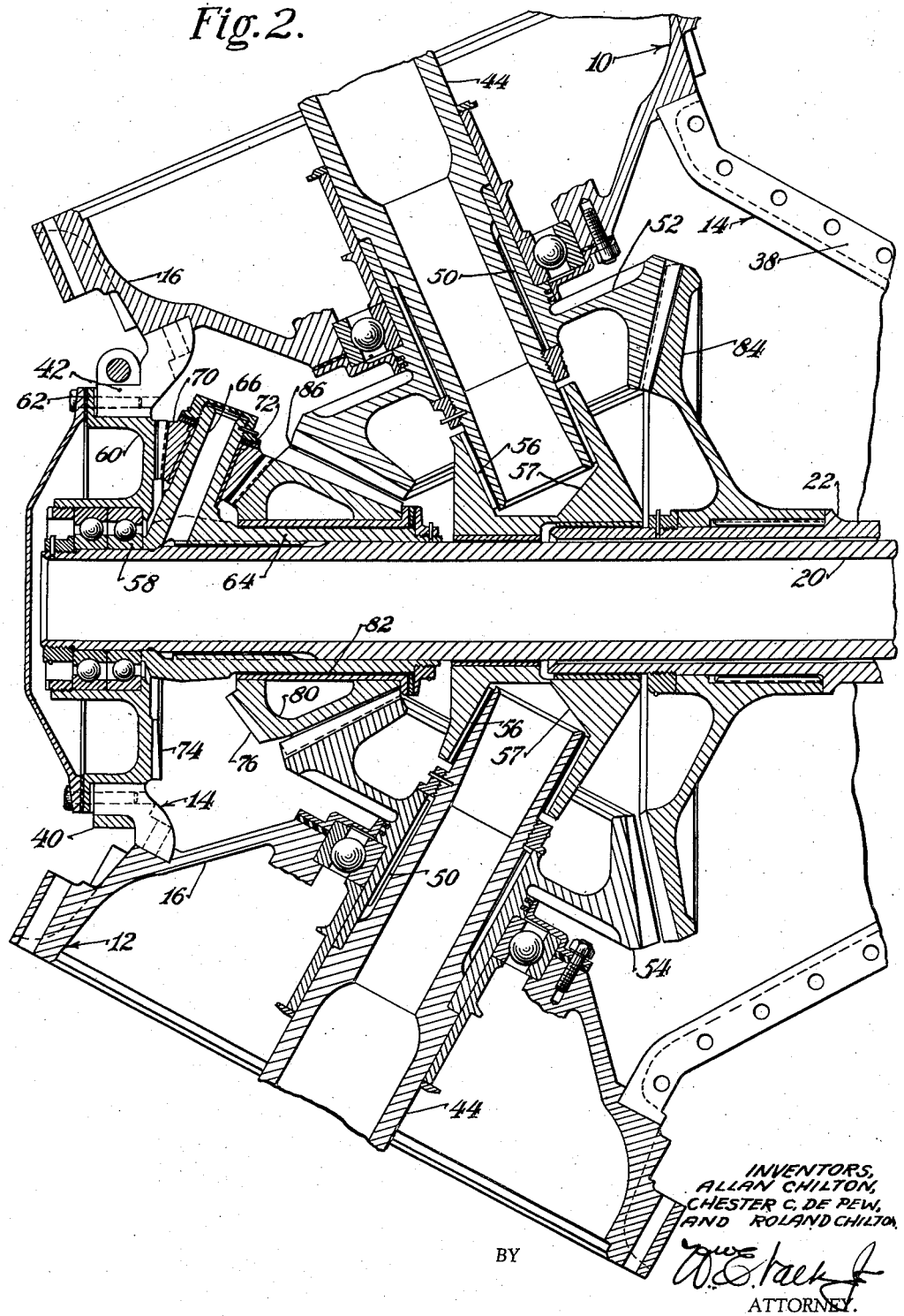
Fig. 2 is a fragmentary horizontal section in the axial plane of Fig. 1.

Referring now to Fig. 2, the nose pieces or front crankcase sections of the engines are again designated 16, the engines themselves being omitted to permit the drawings to be made to legible scale.

It will be noted that the gear housings 14 are split on the horizontal center line, the upper and lower halves being secured together by bolts through flanges 38 and by a circular clamp 40 embracing an annular portion 42 at the rear of the housings.

The front ends of the engine crankshafts 44 are splined at 50 for mounting bevel gears 52, 54 of the left and right hand engines 10 and 12, respectively, and extension bearings 56 are also provided, these being carried in a member 57 running free on the shafts 20 and 22. The inner propeller shaft 20 is provided with a thrust bearing 58 engaged in a supporting member 60 secured in the annular portion 42 of the housing 14 by bolts 62 and by the clamp ring 40 previously described. The inner shaft 20 has splined to it a hub 64 carrying spider arms for a planetary reduction gear, one of which arms is shown at 66 and each of which is equipped with a bevel pinion 70 and a suitable thrust bearing 72. These planet pinions engage bevel teeth 74 cut on the stationary member 60 and bevel teeth 76 formed on a bevel pinion 80 which is free for rotation on bushings 82 on the hub 64. The outer propeller shaft 22 has splined to it a large bevel gear 84 and is free to rotate around the inner shaft 20.

The angular disposition of the engine crankshafts 44 are not exactly symmetrical with the axis of the propeller shaft 20, 22, but are offset sufficiently so that the driving gear 52 of the left hand engine 10 engages with the gear 84, but clears the pinion 80 as indicated at 86. On the other hand, the bevel gear 54 of the right hand engine 12 meshes with the teeth of the pinion 80 and clears the teeth of the large gear 84.

It will now be seen that the right hand engine 12 drives the pinion 80 at high speed and that the inner shaft 20 is connected thereto through the bevel planetary reduction gear 76, 70, 74. At the same time the left hand engine 10 is connected to the outer shaft 22 by direct engagement of the gears 52, 84, these gears having the diameter ratio appropriate to the gear reduction required between the engine and the propeller. The combination of the bevel pinion 80 and the planetary gear gives an equal gear reduction to the inner shaft 20, but in the opposite direction of rotation. It will be seen that the left hand engine 10 and the outer shaft 22 with the rear propeller comprise a complete engine-propeller combination which may be operated independently, or together with, the engine-propeller combination comprising the right hand engine and the inner shaft 20 with the forward propeller.

Referring now to Fig. 1, it will be seen that the angular disposition of the engines affords an adequate and direct path for cooling air flow from the cowl entrance 28, over the cylinders of each engine and out through the exit slot 32. A baffle bulkhead 29 embraces the engine, this baffle having a circular cutout of a diameter substantially equal to the engine diameter, and having an external periphery of such shape as to lie closely adjacent the inner wall of the cowling 26 and of the rear cowl 30. A conventional inter-cylinder and inter-rocker box baffle system is carried by the engine, typical baffles of this character being shown at 31' and 31 in Fig. 3. The bulkhead 29, in conjunction with the baffles 31 and 31' confines cooling air flow entering the cowling through the cowl entrance 28 to the finned periphery of the engine cylinders, whereby the engines may be more efficiently cooled.

The embodiment of the invention shown utilizes two engines, but it is apparent that more than two may be similarly disposed about a propeller shaft axis common to all engines. For instance, two engines such as 10 might be oppositely disposed to both drive the outer propeller shaft 22, and two engines such as 12 might be oppositely disposed, between the engines 10, to drive the inner shaft 20. Likewise, a plurality of engines might all be drivably connected to a single propeller shaft such as 22.

A particular phase of the invention lies in disposing a plurality of radial engines in inclined relation to a common propeller axis so that a central cooling air opening such as 28, behind the central part of the propeller system, serves all engines, and whereby all the engines may be commonly enclosed by a substantially circular cowling such as 24, whereby the drag, otherwise occasioned by the conventional disposition of a plurality of radial engines, is greatly reduced.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. A multiplex power unit comprising at least two engines each equipped with a bevel gear, inner and outer propeller shafts, a gear secured to said outer shaft and meshed with one of said engine gears, a pinion free for rotation on the inner shaft and engaging the other said engine gear, and planetary reduction gear means between the said pinion and said inner shaft.

2. A duplex power unit comprising right and left hand engines each equipped with a bevel gear, inner and outer propeller shafts, a gear secured to said outer shaft and meshed with one of said engine gears, a pinion free for rotation on the inner shaft and engaging the other said engine gear, and planetary reduction gear means between the said pinion and said inner shaft, the engine gear engaging the large gear, being out of mesh with the pinion and vice versa.

3. A duplex power plant comprising in combination concentric propeller shafts, a gear secured to one shaft, a pinion free for rotation on the other shaft, a reduction gear between said pinion and last said shaft, a pair of engines, a driving gear on each engine, one of said driving gears being meshed with said pinion and free of said propeller shaft gear, and the other engine gear being meshed with said propeller shaft gear and free of said pinion.

4. A duplex aircraft power plant comprising two radial cylinder engines so disposed relative to each other that planes passing through the cylinder axes of respective engines intersect rearwardly of the engines whereby the engines face inwardly and forwardly, ring cowling embracing said engines having an axial air entrance opening through which cooling air may pass to the forward sides of respective engines, propeller shaft means coaxial with said cowling and extending forwardly therebeyond, and transmission gears connecting said engines with said propeller shaft means, said gears lying between said engines.

5. A multiplex aircraft power plant comprising a ring cowling inturned at its leading edge to define a substantially circular air entrance opening, a casing substantially concentric with the cowling carrying propeller shaft means extending forwardly beyond the cowling, and a plurality of radial cylinder engines disposed about said casing and within said cowling, each drivably connected to said propeller shaft means within said casing, the plane passing through cylinders of each engine being slanted substantially from a point adjacent the border of said air entrance opening to an intersection with the axis of said propeller shaft means rearward of said casing so that the fronts of the engines face forwardly and inwardly to receive cooling air direct from said air entrance opening.

6. A multiplex aircraft power plant comprising a ring cowling inturned at its leading edge to define a substantially circular air entrance opening, a casing substantially concentric with the cowling carrying propeller shaft means extending forwardly beyond the cowling, and a plurality of radial cylinder engines disposed about said casing and within said cowling, each drivably connected to said propeller shaft means within said casing, the plane passing through cylinders of each engine being slanted substantially from a point adjacent the border of said air entrance opening to an intersection with the axis of said propeller shaft means rearward of said casing so that the fronts of the engines face forwardly and inwardly to receive cooling air direct from said air entrance opening, said engines each including a baffle bulkhead between the engine cylinders and the cowling to confine cooling air flow passing the engines to the cylinder surfaces.

7. A multiplex aircraft power plant comprising a ring cowling inturned at its leading edge to define a substantially circular air entrance opening, a casing substantially concentric with the cowling carrying propeller shaft means extending forwardly beyond the cowling, and a plurality of radial cylinder engines disposed about said casing and within said cowling, each drivably connected to said propeller shaft means within said casing, the plane passing through cylinders of each engine being slanted substantially from a point adjacent the border of said air entrance opening to an intersection with the axis of said propeller shaft means rearward of said casing so that the fronts of the engines face forwardly and inwardly to receive cooling air direct from said air entrance opening, and a mounting structure rearward of the power plant for supporting said engines.

8. In an aircraft power plant in combination, a body having a substantially circular forward end, an annular cowl forward thereof and coaxial therewith, open at its rearward end to define with said body forward end an annular air exit opening, said cowling being open at its forward end to define an air entrance opening, a plurality of bulkheads, each having a substantially circular opening, disposed in V arrangement within said cowling with the apex of the V substantially intersecting the axis of said cowling at the forward end of said body, said bulkheads diverging forwardly therefrom to intersections with the ring cowl adjacent the edge of said air entrance opening, and a radial cylinder engine disposed substantially concentrically in the circular opening of each bulkhead and having a plane passing through the engine cylinders substantially coincident with the bulkhead, said engines being thereby disposed to receive cooling air on the forward sides of the several cylinders from said air entrance opening.

9. In an aircraft power plant in combination, a body having a substantially circular forward end, an annular cowl forward thereof and coaxial therewith, open at its rearward end to define with said body forward end an annular air exit opening, said cowling being open at its forward end to define an air entrance opening, a plurality of bulkheads, each having a substantially circular opening, disposed in V arrangement within said cowling with the apex of the V substantially intersecting the axis of said cowling at the forward end of said body, said bulkheads diverging forwardly therefrom to intersections with the ring cowl adjacent the edge of said air entrance opening, a radial cylinder engine disposed substantially concentrically in the circular opening of each bulkhead and having a plane passing through the engine cylinders substantially coincident with the bulkhead, said engines being thereby disposed to receive cooling air on the forward sides of the several cylinders from said air entrance opening, and a common transmission housing between said engines including propeller shaft means coaxial with the cowl and extending forwardly thereof, and mechanism drivably connecting said propeller shaft means to said engines.

10. A multiplex power plant comprising at least two radial cylinder engines having central shafts at their forward ends, the planes of the cylinders of respective engines intersecting rearward of the engines and diverging forwardly and outwardly from the intersection whereby the fronts of the engines face forwardly and toward one another, unitary cowl means embracing the engines and having a central forward opening for entraining cooling air into the space defined between and forward of said engines, baffle means defining a path of cooling airflow from said space past the cylinder surfaces of respective engines, and a central gear unit drivably secured to said engines and occupying a part of said space between and forward of the engines, said unit including propeller shaft means extending forwardly of said engines and cowling, driven by said engines through said unit.

ALLAN CHILTON.
ROLAND CHILTON.
CHESTER C. DE PEW.